United States Patent [19]

Stelzl

[11] Patent Number: 5,025,892

[45] Date of Patent: Jun. 25, 1991

[54] PORTABLE LIFT FOR LIFTING MOTOR VEHICLES

[76] Inventor: Florian Stelzl, Liesing 11, A-8773 Kammern, Austria

[21] Appl. No.: 332,975

[22] Filed: Apr. 4, 1989

[30] Foreign Application Priority Data

Apr. 7, 1988 [AT] Austria .................................. 905/88

[51] Int. Cl.[5] .............................................. B60S 13/00

[52] U.S. Cl. ................................. 187/8.72; 254/89 H

[58] Field of Search ...................... 187/9 R, 8.41, 8.71, 187/8.72, 8.75, 18, 8.47; 254/89 R, 89 H, 90; 269/323

[56] References Cited

U.S. PATENT DOCUMENTS

| | | | |
|---|---|---|---|
| 2,576,908 | 11/1951 | Wallace | 187/8.71 |
| 2,629,583 | 2/1953 | Mueller | 254/8 |
| 3,065,573 | 11/1962 | Goldberg | 254/89 H |
| 3,276,548 | 10/1966 | Woor et al. | 187/8.47 |
| 3,783,976 | 1/1974 | Kerr | 187/8.49 |
| 3,806,109 | 4/1974 | Weber et al. | 269/323 |
| 3,814,414 | 6/1974 | Chapa | 269/323 |
| 4,323,141 | 4/1982 | Ragan et al. | 187/8.47 |
| 4,724,930 | 2/1988 | VanLierop | 254/89 H |
| 4,798,266 | 1/1989 | Finkbeiner | 254/89 H |

FOREIGN PATENT DOCUMENTS

| | | | |
|---|---|---|---|
| 1171584 | 6/1964 | Fed. Rep. of Germany | 187/8.71 |
| 2117451 | 10/1971 | Fed. Rep. of Germany . | |
| 3421159 | 4/1986 | Fed. Rep. of Germany . | |
| 606477 | 4/1959 | Italy | 187/8.72 |
| 2188610 | 2/1986 | United Kingdom . | |
| 2187709 | 9/1987 | United Kingdom . | |

*Primary Examiner*—Joseph E. Valenza
*Assistant Examiner*—Kenneth Noland
*Attorney, Agent, or Firm*—Peter E. Rosden

[57] ABSTRACT

A portable lift for lifting motor vehicles comprises a lift arm (6) the arm being pivotally articulated and lowerable into a position between lateral parts of base frame (1) which form a drive-on ramp, with lateral support arms (7) mounted on its free ends, the arms being guided by a parallelogram guide (10) parallel to the plane of the ground. To pivot lift arm (6), a hydraulic cylinder and piston assembly (3) is used which is mounted at a distance from pivot axis (5) of lift arm (6) which, at the maximum operating height of support arms (7), forms a pivot angle (alpha) of the axis of cylinder and piston assembly (3) to the plane of the ground between 75 degrees and 105 degrees. Cylinder and piston assembly (3) engages lift arm (6) at a distance from the free end which corresponds to at least 15 percent of the length of lift arm (6), and lift arm (6) is formed between the point of engagement of cylinder and piston assembly (3) and the articulation point of support arms (7) essentially as U-shaped members open toward the free end thereof.

10 Claims, 2 Drawing Sheets

PORTABLE LIFT FOR LIFTING MOTOR VEHICLES

Figure 1:
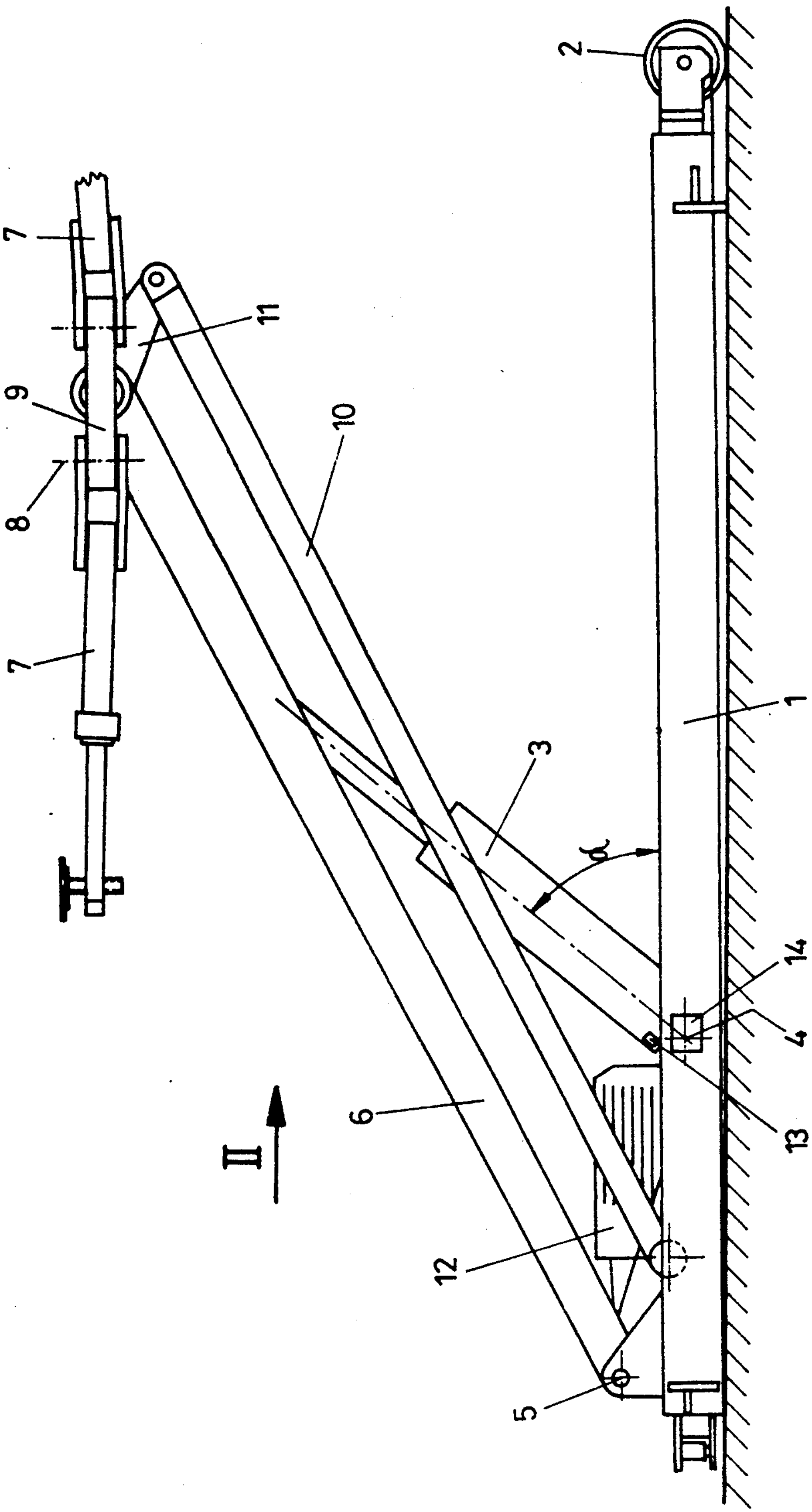

The invention relates to a portable lift for lifting motor vehicles with a pivotable lifting arm, said arm being pivotably articulated to a portable base frame and lowerable into a position between lateral parts of the base frame forming a drive-on ramp, said lifting arm having at its free end lateral support arms guided parallel to the surface of the ground by a parallelogram guide and the lifting arm being pivotable by means of a hydraulic cylinder and piston assembly, said cylinder and piston assembly engaging at a distance from the free end of the lifting arm, said distance corresponding at least to 15 percent of the length of the lifting arm, as well as a method for lifting a motor vehicle using a lift of this type.

In addition to stationary lifts, in which a platform can be raised by means of at most four lifting drives disposed at the corners of a platform, portable devices for lifting motor vehicles are known which are called service station lifts. The abovementioned stationary devices for lifting motor vehicles have proven effective in garages and, after the motor vehicle has been lifted, allow largely free access to a plurality of assemblies, especially the transmission of the drive shaft and the exhaust system. When working in the area of the wheel suspension and the brakes of motor vehicles, it is necessary as a rule to lift the wheels off the ground. Therefore, automobile lifts of a different design are better suited for work of this kind, for example the abovementioned service station lifts, in which the motor vehicle can be lifted by appropriately reinforced and stable points on its body so that the tires can be lifted off the ground.

In order to achieve complete lifting of a motor vehicle using service station lifts of this kind, four such lifts are required. Coordinated lifting, in which the vehicle is raised parallel to the surface of the ground, cannot be accomplished in simple fashion with individual lifts of this kind.

According to a design disclosed for example in British Patent No. 2,188,610, a portable lift is provided by which a motor vehicle can be lifted with a single portable or movable and appropriately amply dimensioned lift, with the motor vehicle being held parallel to the surface of the ground while being lifted and while in the raised position.

The goal of the invention is to improve upon and expand a portable lift of the type recited hereinabove, in such manner that stability and safety are improved and the ground clearance in the raised position is improved, i.e., access to the underside of the vehicle. Thus, with the device according to the invention, it is not only possible to open all the doors without restriction and to do so regardless of whether the vehicle is at the lowest or highest point on the lift, but it is also intended to facilitate work on all assemblies, such as the exhaust, transmission, axles, drive shaft, brakes, or the like. To achieve this goal and improve the stability of the lift, the design according to the invention essentially consists in mounting the hydraulic cylinder and piston assembly at a distance from the pivot axis of the lift arm, which at the maximum operating height of the support arms results in a pivot angle of the axis of the cylinder and piston assembly with respect to the ground of between 75 degrees and 105 degrees, preferably approximately 90 degrees, and by the lift arm between the point of engagement of the cylinder and piston assembly and the articulation point of the support arms, being designed essentially as a U-shaped member open toward the free end of the latter. The fact that the cylinder and piston assembly is at an angle of 75 degrees to 105 degrees to the surface of the ground for raising the lift arm at the rated operating height of the lift, the reaction forces are better accepted and greater stability is achieved. Since the cylinder and piston assembly engages at a distance from the free end of the lift arm, space is provided above the cylinder and piston assembly which improves the accessibility of the assemblies, and it is very important for improving accessibility for the lift arm between the point of engagement of the cylinder and piston assembly and the articulation point of the support arms to be made essentially in the form of a U-shaped member open toward the free end thereof. Such a design for the upper end of the lift arm at which the support arm for supporting the floor pan of the motor vehicle engages, creates an appropriate clearance which makes it possible to remove the drive shaft and exhaust system without being impeded by the lift.

Advantageously, the design for improving stability is such that the support arms are pivotably articulated at the free ends of the open U-shaped member in a manner known of itself, around an axis which is essentially normal to the plane of the ground and are connected inclined upward at an angle of at least 5 degrees starting at this point of articulation. Such an angled arrangement of the support arms engaging at the free end of the lift arm, especially a suitably offset design, further increases the available clearance and further improves the accessibility of the assemblies of a motor vehicle accessible from the underside thereof. The angling and offset create additional clearance and increase the stability of the position of the motor vehicle on the lift.

In order not in any way to affect adversely the clearance between the legs of the open U-shaped member in the free end area of the lift arm, the design is advantageously made such that a parallelogram guide for the support arms is associated with each leg of the U of the lift arm. The arrangement of two parallelogram guides makes it possible to eliminate connecting rods in the end area of the lift arm and to guide in separate and parallel fashion the support arms, each of which engages one of the free legs of the U-shaped member. This in turn results in an improvement in accessibility of the assemblies from the underside of the vehicle and to an increase in available clearance.

As a result of the kinematics of the drive and the pivoting of the hydraulic cylinder and piston assembly, starting at a position in which it is pivoted toward the ground, into a supporting position essentially perpendicular to the ground, a relatively high hydraulic pressure is required at the beginning of the lifting process in order to make lifting possible. In the course of the lifting process, the required hydraulic pressure in the hydraulic cylinder and piston assembly decreases. Safety monitoring in a design of this kind is advantageously possible if the design is made such that the cylinder and piston assembly is provided with an angle position sensor and/or a pressure sensor for the hydraulic medium. The angle position sensor can be used to limit the stroke travel of the lift to prevent the lift from being swiveled into an unstable position. If a pressure sensor for the hydraulic medium is also provided, the hydraulic pessure which falls during lifting can be monitored to ensure that a drop in hydraulic pressure does not result in unacceptably low and hence correspondingly unstable values. The method for lifting a motor vehicle using a lift of this kind is for this reason advantageously performed according to the invention in such manner that the supply of the hydraulic medium is controlled as a function of the pressure in the cylinder and piston assembly and is shut off when it falls to a predetermined minimum value. This ensures that even in the raised position, an appropriate load is deflected to the hydraulic cylinder and piston assembly, ensuring the stability of the lift in all operating positions.

The invention will now be described in greater detail with reference to one embodiment shown schematically in the drawing. In the latter, FIG. 1 is a schematic side view of a lift according to the invention and FIG. 2 is a partial view in the direction of arrow 2 in FIG. 1.

In FIG. 1 a portable base frame 1 is shown, to which rollers 2 are fastened for shifting or moving the base frame. A hydraulic cylinder and piston assembly 3 is supported on base frame 1 in pivotable fashion, the pivot axis 4 of said assembly being lower than the pivot axis 5 of lift arm 6 for lifting a motor vehicle. At the free end of lift arm 6, support arms 7 are attached which engage the free end of lift arm 6, said arms 7 being pivotable about a pivot axis 8 which is essentially perpendicular to the plane of the ground. Bearing part 9, which support arms 7 engage pivotably, is kept essentially parallel to the plane of the base frame even during the lifting process and in all other positions, for which purpose a parallelogram guide 10 is provided which engages bearing part 9 by an angle arm 11.

The drive motor for the hydraulic system is indicated by the number 12 in FIG. 1. In the view shown in FIG. 1, the lift is not yet at the rated height, since the angle alpha between the axis of hydraulic cylinder and piston assembly 3 and the plane formed by the base frame is still less than 75 degrees. In a pivoted position of this kind, the pressure in hydraulic cylinder and piston assembly 3 is greater than in a position in which the access of the cylinder and piston assembly 3 is at an angle of 75 degrees to 105 degrees to the plane of the base frame, so that when the lift is raised or elevated, the pressure of the medium in the hydraulic cylinder and piston assembly can be monitored by a pressure sensor 13 shown schematically. As soon as the pressure has fallen to a predetermined safety level, further feed of pressure medium is discontinued. Since the pressure at the beginning of the lifting process is much greater than in the final stage, it is additionally desirable in all cases to provide an angle sensor engaging pivot axis 4 and indicated schematically by 14, said sensor ensuring that at the beginning of the lifting process the correspondingly higher pressure is made available and shutoff of the system as a function of pressure is only possible after a predetermined minimum pivoting position is reached.

Figure 2:
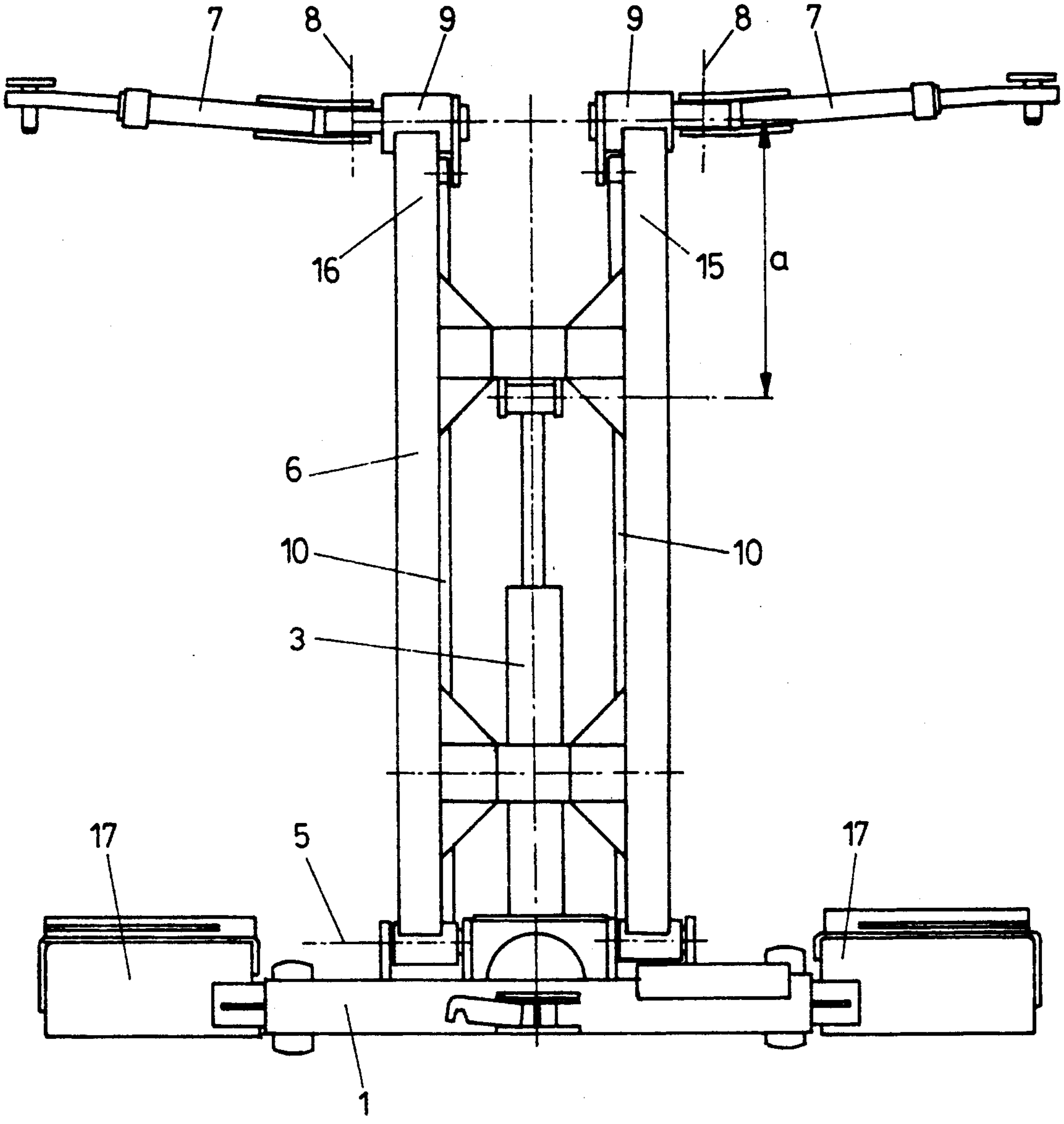

In the drawing in FIG. 2, the end area of lift arm 6 is shown more clearly and the measures facilitating accessibility of assemblies on the underside of a motor vehicle are more clearly apparent. Hydraulic cylinder and piston assembly 3 engages lift arm 6 at a distance a from the free end of lift arm 6 which in the drawing in FIG. 2 corresponds to approximately one-third of the length of the lift arm. In this manner, the free end of lift arm 6 can be made in the form of an essentially U-shaped member without loss of stability, the free legs of said member being labeled 15 and 16. In turn bearing part 9 for support arms 7 is connected to each of these free legs 15 and 16 and each of these two bearing parts 9 is guided parallel relative to the plane of base frame 1 by a separate parallelogram rod 10. Between the two free legs 15 and 16 of the U-shaped member, therefore, suitable clearance is left which facilitates the removal of drive shafts, exhaust systems, and the like.

In the drawing shown in FIG. 2, drive-on ramps and driving surfaces 17 connected laterally to the base frame are shown schematically. Lift arm 6 can be lowered to a position between these lateral ramp parts or driving surface parts 17 by pivoting it about pivot axis 5.

I claim:

1. Portable lift for lifting motor vehicles with a pivotable lift arm, said arm being pivotably articulated to a portable base frame and lowerable into a position between lateral parts of the base frame which form a drive-on ramp, with the lift arm having at its free end lateral support arms which are guided parallel to the plane of the ground by a parallelogram guide and the lift arm is pivotable by means of a hydraulic cylinder and piston assembly, said cylinder and piston assembly engaging at a distance from the free end of the lift arm which corresponds to at least 15 percent of the length of the lift arm, characterized by the fact that hydraulic cylinder and piston assembly (3) is mounted at a distance from pivot axis (5) of lift arm (6) which at the maximum operating height of support arms (7) results in a pivot angle for the axis of cylinder and piston assembly (3) with respect to the plane of the ground of between 75 degrees and 105 degrees, preferably approximately 90 degrees, and by the fact that lift arm (6) is formed between the point of engagement of cylinder and piston assembly (3) and the articulation point of support arms (7) essentially as a U-shaped member open toward the free end thereof.

2. Lift according to claim 1, characterized by support arms (7) being articulated at the free ends (15, 16) of the open U-shaped member pivotable about an axis (8) essentially perpendicular to the plane of the ground, and being connected inclined upward at an angle of at least 5 degrees starting at this articulation point.

3. Lift according to claim 2, characterized by a parallelogram guide (10) being provided for the support arms (7) of each U-shaped leg (15, 16) of lift arm (6).

4. Lift according to claim 3, characterized by cylinder and piston assembly (3) being provided with an angle position sensor (4) for the hydraulic medium.

5. Lift according to claim 1, characterized by a parallelogram guide (10) being provided for the support arms (7) of each U-shaped leg (15, 16) of lift arm (6).

6. Lift according to claim 1, characterized by cylinder and piston assembly (3) being provided with an angle position sensor (4) for the hydraulic medium.

7. Lift according to claim 2, characterized by cylinder and piston assembly (3) being provided with an angle position sensor (4) for the hydraulic medium.

8. Lift according to claim 1, characterized by cylinder and piston assembly (3) being provided with a pressure sensor (13) for the hydraulic medium.

9. Lift according to claim 2, characterized by cylinder and piston assembly (3) being provided with a pressure sensor (13) for the hydraulic medium.

10. Lift according to claim 3, characterized by cylinder and piston assembly (3) being provided with a pressure sensor (13) for the hydraulic medium.

* * * * *